US012700284B2

(12) United States Patent
Satterlie et al.

(10) Patent No.: US 12,700,284 B2
(45) Date of Patent: Aug. 4, 2026

(54) GAMING DEVICE WITH INCREMENTABLE MULTIPLIER METER AND TRANSITIONAL INDICATOR

(71) Applicant: Aristocrat Technologies Australia Pty Limited, North Ryde (AU)

(72) Inventors: Eric Satterlie, Las Vegas, NV (US); Chantrelle Pryor, Las Vegas, NV (US); Paul Lombardo, Newport (AU); Liam Sanders, Neutral Bay (AU); Jason Meyer, Wyoming (AU); Gary Penacho, Henderson, NV (US); Patrick Finch, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 273 days.

(21) Appl. No.: 18/216,474

(22) Filed: Jun. 29, 2023

(65) Prior Publication Data

US 2023/0351854 A1 Nov. 2, 2023

Related U.S. Application Data

(63) Continuation of application No. 17/549,729, filed on Dec. 13, 2021, now Pat. No. 11,735,009, which is a (Continued)

(30) Foreign Application Priority Data

Jun. 12, 2018 (AU) ................................ 2018204151

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
None
See application file for complete search history.

(56) References Cited

U.S. PATENT DOCUMENTS

| | | | |
|---|---|---|---|
| 2,015,007 | A | 9/1935 | Emerson |
| D392,340 | S | 3/1998 | Desimone |

(Continued)

FOREIGN PATENT DOCUMENTS

| | | | |
|---|---|---|---|
| EP | 1105198 | A1 | 6/2001 |
| EP | 1453019 | A2 | 9/2004 |
| EP | 1105198 | B1 | 10/2004 |

OTHER PUBLICATIONS

TwinStar J43 video slot machine cabinet, Nov. 9, 2016, CasinoJournal.com iconswebsite.com [online], [site visited Feb. 8, 2019]. Available from Internet: https://www.casinojournal.com/articles/90899-twinstar-j43-video-slot-machine-cabinetscientific-games (Year: 2016).

(Continued)

*Primary Examiner* — Tramar Harper
(74) *Attorney, Agent, or Firm* — ALG Intellectual Property, LLC

(57) ABSTRACT

A gaming device that initiates a series of game instances, and controls a display to display a multiplier meter that a) has a plurality of multiplier levels corresponding to respective ones of a sequence of multipliers applying to outcomes of the game instances and b) when a multiplier applies, indicates a current multiplier level. A processor initializes a designated symbol counter, the processor selects symbols for display for a game instance, evaluates the symbols displayed to identify any winning combinations of symbols, and for each winning combination determines an award amount, adds any awards to the win meter, increments the designated symbol counter by a number of designated symbols, changes the current multiplier level upon the designated symbol counter exceeding a defined threshold (Continued)

applying to a respective multiplier level, and updates the multiplier meter to indicate the current multiplier level.

20 Claims, 14 Drawing Sheets

Related U.S. Application Data continuation of application No. 16/438,366, filed on Jun. 11, 2019, now Pat. No. 11,200,782.

(56) References Cited

U.S. PATENT DOCUMENTS 5,882,261 A 3/1999 Adams
D420,994 S 2/2000 Niijima
6,068,552 A 5/2000 Walker
D435,561 S 12/2000 Pettigrew
6,315,660 B1 11/2001 Demar
6,520,856 B1 2/2003 Walker
D501,213 S 1/2005 Totten
D529,038 S 9/2006 Sapp
7,182,689 B2 * 2/2007 Hughs-Baird ...... G07F 17/3244 463/20
D588,605 S 3/2009 Okada
D589,972 S 4/2009 Casagrande
D594,468 S 6/2009 Bamford
D598,930 S 8/2009 Amos
D610,161 S 2/2010 Matas
D614,190 S 4/2010 Um
D616,892 S 6/2010 Christie
7,749,072 B1 7/2010 Singer
D622,283 S 8/2010 Van Os
D623,194 S 9/2010 Cook
D624,933 S 10/2010 Fitzmaurice
D627,362 S 11/2010 Christie
D636,398 S 4/2011 Matas
D656,508 S 3/2012 Makhlouf
D668,261 S 10/2012 Arnold
8,328,628 B2 12/2012 Kim
D678,899 S 3/2013 Gleasman
8,398,475 B2 3/2013 De Waal
D683,748 S 6/2013 Chutani
D683,749 S 6/2013 Hally
D683,750 S 6/2013 Hally
8,512,132 B2 8/2013 Nicely
D701,223 S 3/2014 Cho
D701,518 S 3/2014 Thornton
8,734,234 B1 * 5/2014 Guase .................... A63F 13/50 463/16
D711,398 S 8/2014 Safa
D711,417 S 8/2014 Wen
D723,054 S 2/2015 Nagaoka
D727,943 S 4/2015 Bergher
D727,948 S 4/2015 Milliotte
9,015,286 B2 4/2015 Nathan
D728,585 S 5/2015 Lee
D728,602 S 5/2015 Bergher
D733,181 S 6/2015 Manfredo
D733,745 S 7/2015 Huang
D739,417 S 9/2015 Laverack
9,147,306 B2 9/2015 Nicely
D741,879 S 10/2015 Chapman
D749,117 S 2/2016 Huang
D749,118 S 2/2016 Wang
D749,128 S 2/2016 Perez
D749,633 S 2/2016 Perez
D750,098 S 2/2016 Song
9,257,008 B2 2/2016 Plowman
D751,591 S 3/2016 Sic
D752,089 S 3/2016 Cru
D754,181 S 4/2016 Dong
9,305,419 B2 4/2016 Kim
D757,791 S 5/2016 Van Os
D758,407 S 6/2016 Kim
D759,046 S 6/2016 Goetz
D759,086 S 6/2016 Aoshima
D763,885 S 8/2016 Liu
D763,894 S 8/2016 Lamparelli
D772,240 S 11/2016 Marcus
D774,067 S 12/2016 Kim
D775,176 S 12/2016 Mitchell
D778,938 S 2/2017 Wingate-Whyte
D780,799 S 3/2017 Mehring
D787,537 S 5/2017 Kim
D794,045 S 8/2017 Akana
9,773,375 B2 9/2017 Baerlocher
D804,493 S 12/2017 Daniel
D805,094 S 12/2017 Yang
D823,883 S 7/2018 Stringham
D826,254 S 8/2018 Yuguchi
10,039,970 B2 8/2018 Lee
D840,429 S 2/2019 Kroon
D841,036 S 2/2019 Clediere
D847,830 S 5/2019 Chapman
D850,464 S 6/2019 Satterlie
D852,830 S 7/2019 Penacho
D870,138 S 12/2019 Penacho
D879,827 S 3/2020 Penacho
D900,127 S 10/2020 Visser
D904,452 S 12/2020 Kroon
D940,750 S 1/2022 Kroon
D1,003,931 S 11/2023 Kroon
D1,068,800 S 4/2025 Leal
D1,072,864 S 4/2025 Marks
2002/0039923 A1 4/2002 Cannon
2003/0222402 A1 * 12/2003 Olive .................. G07F 17/3267 463/20
2004/0038731 A1 2/2004 Englman
2004/0077403 A1 4/2004 Maya
2004/0127281 A1 * 7/2004 Fong ................... G07F 17/3267 463/20
2004/0162134 A1 * 8/2004 Walker ................ G07F 17/3269 463/20
2004/0214631 A1 * 10/2004 Devaull .................. G07F 17/32 463/20
2004/0248642 A1 12/2004 Rothschild
2005/0054429 A1 * 3/2005 Baerlocher ............. G07F 17/32 463/20
2006/0052151 A1 3/2006 Gomez
2006/0063584 A1 3/2006 Brill
2006/0068872 A1 * 3/2006 Walker .................... G07F 17/32 463/13
2006/0148553 A1 7/2006 Dodge
2006/0247006 A1 * 11/2006 Inamura ................ G07F 17/323 463/20
2006/0247033 A1 11/2006 Walker
2006/0252546 A1 * 11/2006 Castellari ............ G07F 17/3293 463/29
2007/0270208 A1 11/2007 Caspers
2007/0281778 A1 12/2007 Bigelow, Jr.
2008/0039191 A1 * 2/2008 Cuddy .................... G07F 17/32 463/25
2008/0064478 A1 * 3/2008 Roukis .................... G07F 17/34 463/20
2008/0072152 A1 3/2008 Crow
2008/0139305 A1 * 6/2008 Vallejo ................ G07F 17/3258 463/42
2008/0176647 A1 7/2008 Acres
2008/0227550 A1 * 9/2008 Vallejo ................ G07F 17/3267 463/42
2008/0261676 A1 10/2008 Fujimoto
2008/0261677 A1 10/2008 Fujimoto
2008/0318668 A1 * 12/2008 Ching ................. G07F 17/3258 463/25
2009/0075712 A1 * 3/2009 Englman ................. G07F 17/32 463/25
2009/0093299 A1 4/2009 Acres
2009/0111566 A1 4/2009 Naicker
2009/0124339 A1 5/2009 Barton
2009/0124364 A1 * 5/2009 Cuddy .................... G07F 17/32 463/31
2009/0215523 A1 8/2009 Acres

(56) References Cited

U.S. PATENT DOCUMENTS

| | | | | | |
|---|---|---|---|---|---|
| 2009/0291737 | A1 | 11/2009 | Ajiro | | |
| 2009/0298573 | A1 | 12/2009 | Bramble | | |
| 2009/0325663 | A1 | 12/2009 | Kelly | | |
| 2010/0016069 | A1 * | 1/2010 | Herrmann | G07F 17/3239 | 463/25 |
| 2011/0003637 | A1 * | 1/2011 | LeFever | G07F 17/3258 | 463/42 |
| 2011/0045898 | A1 | 2/2011 | Anderson | | |
| 2011/0197157 | A1 | 8/2011 | Hoffman | | |
| 2013/0143645 | A1 * | 6/2013 | Schaefer | G07F 17/3267 | 463/25 |
| 2014/0051496 | A1 | 2/2014 | Meyer | | |
| 2014/0094270 | A1 | 4/2014 | Cuddy | | |
| 2014/0094293 | A1 | 4/2014 | Nicely | | |
| 2014/0179400 | A1 | 6/2014 | Lee | | |
| 2014/0333528 | A1 | 11/2014 | Murata | | |
| 2014/0335934 | A1 | 11/2014 | Meyer | | |
| 2015/0018087 | A1 | 1/2015 | Nicely | | |
| 2015/0074615 | A1 | 3/2015 | Han | | |
| 2015/0087376 | A1 | 3/2015 | Hutchinson-Kay | | |
| 2015/0205930 | A1 | 7/2015 | Shaanan | | |
| 2015/0205938 | A1 | 7/2015 | Dagdeviren | | |
| 2015/0326625 | A1 | 11/2015 | Rosenberg | | |
| 2015/0379822 | A1 | 12/2015 | Ellis | | |
| 2016/0086443 | A1 | 3/2016 | Baerlocher | | |
| 2016/0093162 | A1 * | 3/2016 | Marston | G07F 17/3258 | 463/25 |
| 2016/0104344 | A1 * | 4/2016 | Meyer | G07F 17/3258 | 463/20 |
| 2016/0110943 | A1 | 4/2016 | Nicely | | |
| 2016/0117887 | A1 | 4/2016 | Berman | | |
| 2016/0253873 | A1 | 9/2016 | Olive | | |
| 2017/0092068 | A1 | 3/2017 | Vann | | |
| 2017/0124799 | A1 | 5/2017 | Berman | | |
| 2017/0236374 | A1 | 8/2017 | Berman | | |
| 2017/0337776 | A1 * | 11/2017 | Herring | A63F 13/79 | |
| 2018/0089950 | A1 * | 3/2018 | Moody | G07F 17/3244 | |
| 2018/0122189 | A1 * | 5/2018 | Wortmann | G07F 17/3213 | |
| 2018/0225924 | A1 * | 8/2018 | Cohen | G07F 17/3262 | |
| 2018/0225930 | A1 | 8/2018 | Efremescu | | |
| 2019/0051096 | A1 | 2/2019 | San | | |
| 2019/0244472 | A1 * | 8/2019 | Efremescu | G07F 17/34 | |
| 2019/0244480 | A1 * | 8/2019 | Marsh | G07F 17/3258 | |
| 2019/0378379 | A1 | 12/2019 | Satterlie | | |
| 2020/0327779 | A1 | 10/2020 | Sanborn | | |
| 2021/0256812 | A1 * | 8/2021 | Kearns | G07F 17/3213 | |
| 2024/0087423 | A1 | 3/2024 | Uberuaga | | |

OTHER PUBLICATIONS

"More Hearts : Max Bet—Big Win—Aristocrat Slot Machine" Dec. 20, 2013, YouTube, site visited Dec. 21, 2018: https://www.youtube.com/watch?v=V6KRQGr_-al.

"★First Try★ Lock It Link slot machine Diamonds slot ★Full Screen★ Bonus Big Wins!" Mar. 13, 2017, YouTube, site visited Dec. 21, 2018: https://www.youtube.com/watch?v=v2XdhTiZYpQ.

"#5567054 Vector set of design elements for casual games by Elisanth Stock photo Elisanth" May 7, 2015, Stockfresh, site visited Dec. 21, 2018: https://stockfresh.com/image/5567054/vector-set-of-design-elements-for-casual-games.

Why should I choose to design a health bar rather than heart containers? Mar. 15, 2013, StackExchange, site visited Dec. 21, 2018: https://gamedev.stackexchange.com/questions/51060/why-should-i-choose-to-design-a-health-bar-rather-than-heart-containers.

Design U.S. Appl. No. 29/615,031, filed Aug. 25, 2017, and entitled "Gaming Machine Meter and Indicator".

Office Action dated May 5, 2020 for U.S. Appl. No. 16/250,110 (pp. 1-6).

"Heart and star rating set" Aug. 12, 2014, depositphotos, site visited Jul. 16, 2020: https://depositphotos.com/51194413/ stock-illustration-heart-and-star-rating-set.html (Year: 2014).

"Rating Elements With Hearts" Mar. 22, 2015, depositphotos, site visited Jul. 16, 2020: https://depositphotos.com/68174101/ stock-illustration-rating-elements-with-hearts.html (Year: 2015).

"Game Steampunk Energy Time Progress Bar Icons Set" Oct. 8, 2014, CanStockPhoto, site visited Jul. 16, 2020: https:// www.canstockphoto.com/game-steampunk-energy-time-progress-bar-22450393.html (Year: 2014).

"Hearts Are Health" Jul. 18, 2016, tvtropes, site visited Jul. 16, 2020: https://web.archive.org/web/20160718152311/https:// tvtropes.org/pmwiki/pmwiki.php/Main/HeartsAreHealth (Year: 2016).

Notice of Allowance dated Jul. 22, 2020 for U.S. Appl. No. 29/687,504 (pp. 1-6).

Office Action dated Sep. 2, 2020 for U.S. Appl. No. 16/438,366 (pp. 1-23).

Australian Examination Report No. 1 for App. No. AU2019275564, dated Jan. 8, 2021, 5 pages.

Office Action dated Mar. 3, 2021 for U.S. Appl. No. 16/438,366 (pp. 1-32).

Office Action dated Jun. 8, 2021 for U.S. Appl. No. 29/725,268 (pp. 1-10).

Office Action (Notice of Allowance and Fees Due (PTOL-85)) dated Aug. 17, 2021 for U.S. Appl. No. 16/438,366 (pp. 1-7).

Notice of Allowance dated Nov. 8, 2021 for U.S. Appl. No. 29/725,268 (pp. 1-8).

Australian Examination Report No. 1 issued in App. No. AU2022200081, Feb. 22, 2023, 3 pages.

Office Action (Non-Final Rejection) dated Sep. 29, 2022 for U.S. Appl. No. 17/549,729 (pp. 1-15).

Office Action (Notice of Allowance and Fees Due (PTOL-85)) dated Apr. 12, 2023 for U.S. Appl. No. 17/549,729 (pp. 1-13).

Australian Examination Report No. 1 issued in App. No. AU2024201208 dated Apr. 3, 2025, 4 pages.

Notice of Allowance dated May 7, 2025 for U.S. Appl. No. 29/914,873 (pp. 1-9).

* cited by examiner

300

| Reel position | Reel 1 (321) | Reel 2 (322) | Reel 3 (323) | Reel 4 (324) | Reel 5 (325) |
|---|---|---|---|---|---|
| 301 → 1 | Pic 1 | 10 | Pic 3 | Q | Pic 1 |
| 302 → 2 | Wild | Q | K | A | 10 |
| 303 → 3 | J | K | 10 | 10 | A |
| 304 → 4 | Q | A | Q | Pic 2 | Pic 2 |
| 305 → 5 | 10 | Pic 2 | K | J | A |
| 306 → 6 | A | 9 | Pic 1 | Wild (331) | Q |
| 307 → 7 | Pic 2 | Wild | J | 9 | K |
| 308 → 8 | A | Pic 3 | K | 10 | Pic 2 |
| 309 → 9 | Q | Q | 9 | A | 9 |
| 310 → 10 | K | 10 | Q | Q | Wild |
| 311 → 11 | J (341) | A | 10 | J | 9 |
| 312 → 12 | 10 (342) | Wild | Wild | K | Q |
| 313 → 13 | Pic 3 (343) | K | A | Wild | 10 |
| 314 → 14 | Wild | J | A | Pic 3 | Wild |
| 315 → 15 | 9 | 10 | Wild | Pic 1 | A |

FIG. 3

GAMING DEVICE WITH INCREMENTABLE MULTIPLIER METER AND TRANSITIONAL INDICATOR

RELATED APPLICATIONS

The present application is a continuation of U.S. application Ser. No. 17/549,729, filed on Dec. 13, 2021, which is a continuation of U.S. application Ser. No. 16/438,366, filed on Jun. 11, 2019, which issued on Dec. 15, 2021, as U.S. Pat. No. 11,200,782, which claims priority to Australian Patent Application No. AU 2018204151, filed Jun. 12, 2018, and entitled "Display Screen or Portion Thereof with Transitional Graphical User Interface," and is related to U.S. Design application Ser. No. 29/615,031, filed Aug. 25, 2017, and entitled "Gaming Machine Meter and Indicator," and is related to U.S. Design application Ser. No. 29/615,917, filed Aug. 31, 2017, and entitled "Display Screen or Portion Thereof with Transitional Graphical User Interface," (now U.S. Pat. No. D850,464 issued Jun. 4, 2019), which are hereby incorporated by reference in their entireties.

BACKGROUND

The present application relates to a gaming device with a multiplier meter.

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Embodiments of the invention provide a gaming device that has a multiplier meter. The meter indicates a current multiplier level. The meter is advanced to a next level corresponding to a next multiplier upon sufficient designated symbols being collected during the course of a series of game instances. In one example, the meter includes a progress indicator, such as a progress bar, indicative of the progress towards the next multiplier level.

An embodiment of the invention provides a gaming device comprising a display, a processor, and a memory storing a) symbol data specifying a plurality of selectable symbols including a designated symbol, b) a pay table, c) a win meter, and d) instructions. When the instructions are executed by the processor, they cause the processor to initiate a series of game instances, control the display to display a multiplier meter that a) has a plurality of multiplier levels that correspond to respective ones of a sequence of possible multipliers that can apply to outcomes of the game instances and b) when a multiplier applies, indicates a current multiplier level. The processor also initializes a designated symbol counter. In each game instance, the processor selects symbols from the symbol data for display on the display at respective ones of a plurality of symbol positions, evaluates the displayed symbols to identify any winning combinations of symbols, and for each winning combination determine an award amount based on the current multiplier and the pay table, adds any awards to the win meter, increments the designated symbol counter by the number of designated symbols in the displayed symbol, changes the current multiplier level upon the designated symbol counter exceeding a defined threshold that applies to the respective multiplier level, and updates display of the multiplier meter to indicate the current multiplier level.

BRIEF DESCRIPTION OF THE DRAWINGS

An exemplary embodiment of the disclosure will now be described with reference to the accompanying drawings in which:

FIG. 3 illustrates an example reel strip layout.

DETAILED DESCRIPTION

Figure 1:
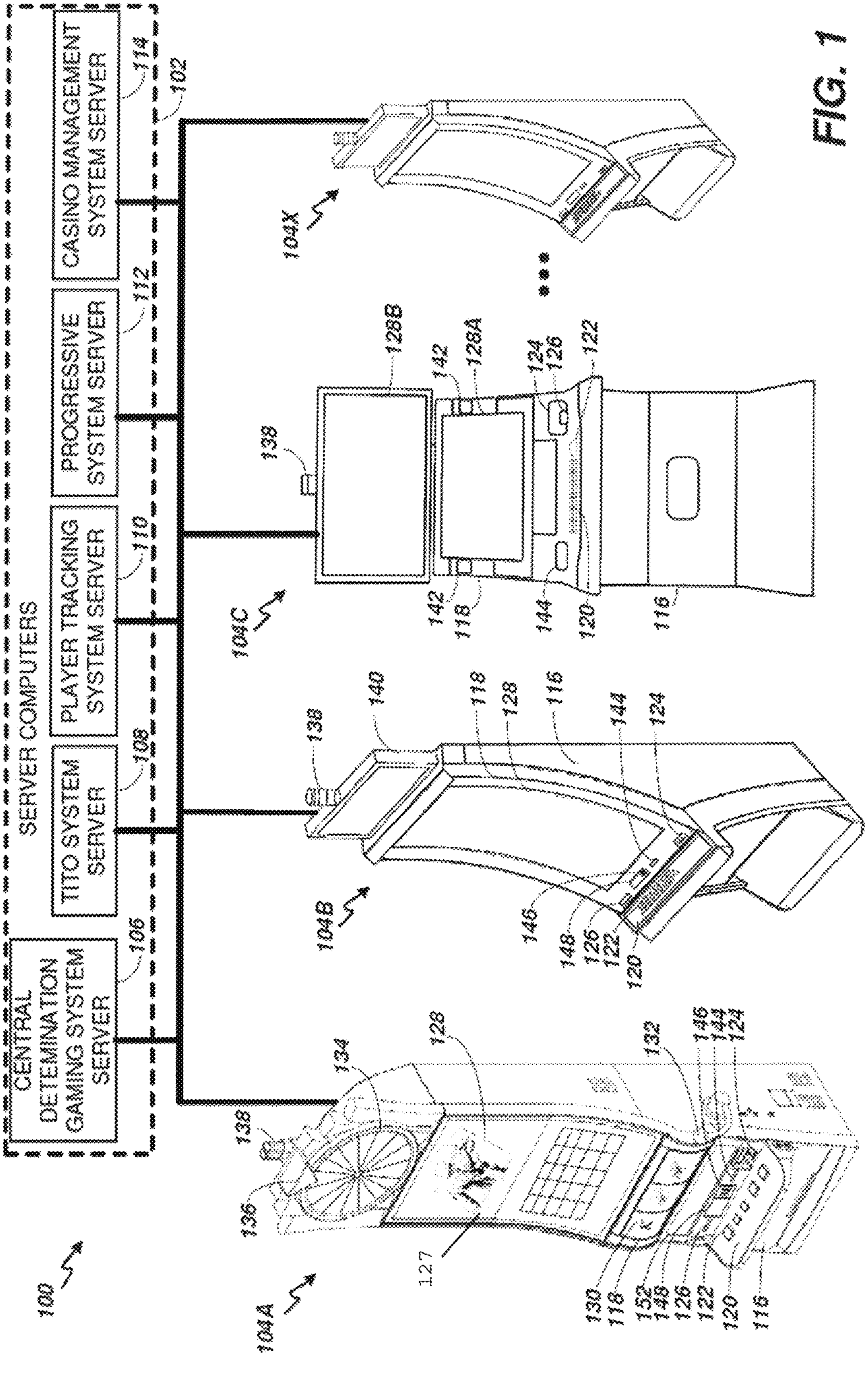
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 118 which provides access to the interior of the main cabinet 116. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 127 comprising a number (typically 3 or 5) of mechanical reels 130 with various symbols displayed on them. The reels 130 are independently spun and stopped to show a set of symbols within the gaming display area 127 which may be used to determine an outcome to the game. In embodiments where the reels are mechanical, mechanisms can be employed to implement greater functionality. For example, the boundaries of the gaming display area boundaries of the gaming display area 127 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 127 may be raised by moving a corresponding mechanical shutter upwards to reveal an additional row of symbol positions on stopped mechanical reels. Further, a transparent or translucent display panel may be overlaid on the gaming display area 127 and controlled to override or supplement what is displayed on one or more of the mechanical reel(s).

In many configurations, the gaming device 104A may have a main display 128 (e.g., video display monitor) mounted to, or above, the gaming display area 127. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in gaming device 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
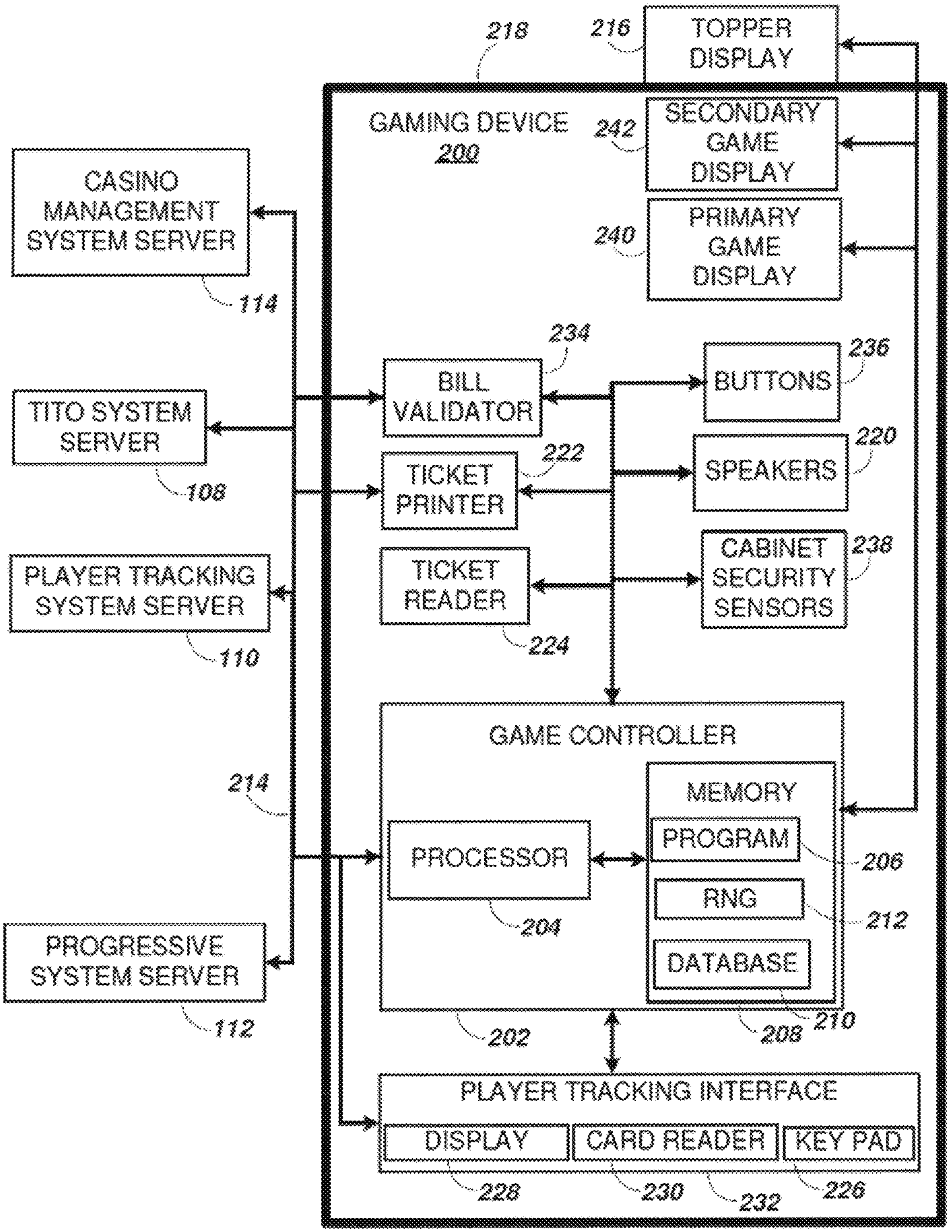
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The main cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the primary game display 240, and the secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

FIG. 3 illustrates an example of a set 300 of five reel strips—a first reel strip 321, a second reel strip 322, a third reel strip 323, a fourth reel strip 324, and a five reel strip 325. In the example, each reel strip has fifteen reel strip positions 301-315. Each reel strip position of each reel has a symbol. For example, a "Wild" symbol 331 occupies the sixth reel strip position 306 of the fourth reel strip 324. Other reels strips similar to those illustrated in FIG. 3 can be used, for example, reel strips where two or more wild symbols are placed at consecutive reel strip positions of a reel strip. In other examples, the reel strips could have between 30 and 100 reel strip positions. The actual length of the feature game reel strips would depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 4:
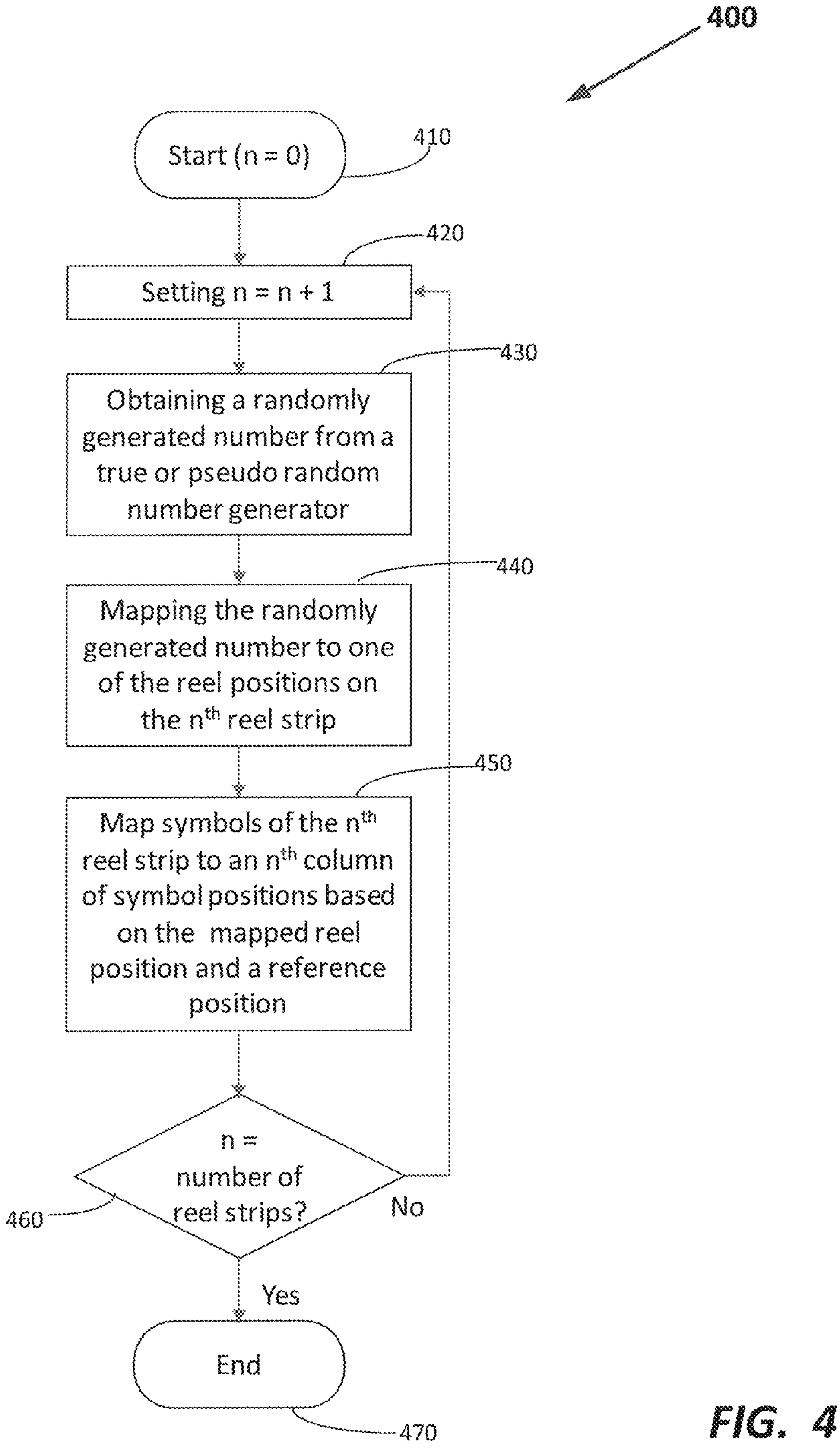
FIG. 4 is a flow chart of a symbol selection method.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430 the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of being selected. In other examples, the ranges may be arranged to weight the relative chances of selecting specific reel strip positions. The reel strips may be of different lengths.

At step 450, the processor 204 maps symbols of the nth reel strip to an nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighbouring reel strip positions are also mapped to the symbol positions of the column. Referring to the example reel strips of FIG. 3, if the value returned by the RNG 212 is mapped to reel position 313, then for the first reel strip 321, "Pic3" symbol 343 is mapped to a bottom symbol position, "10" symbol 342 is mapped to a middle symbol position, and "J" symbol is mapped to a top symbol position.

At step 460, the processor 204 determines whether symbols have been selected for all of the reel strips, and if not the processor reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls the primary game display 240 to display them at the symbol positions. The processor 204 then evaluates the selected symbols, for example for any winning combinations and/or in order to determine whether to trigger a feature game.

Figure 5:
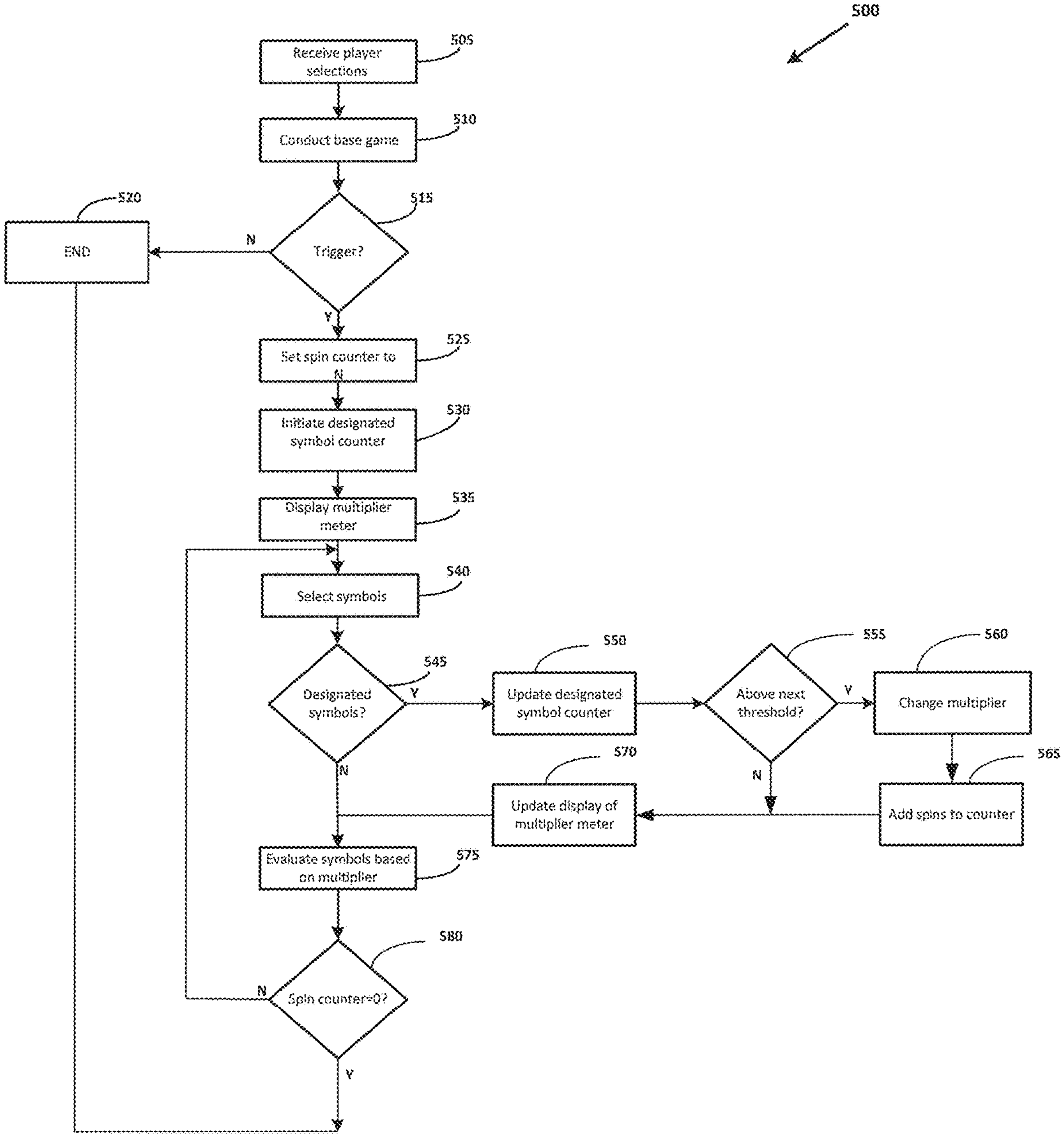
FIG. 5 is a flow chart a method carried out by the processor to conduct a series of game instances.

FIG. 5 is a flow chart of a method 500 carried out by the processor 204 to conduct a series of game instances.

Referring to FIG. 5, at step 505, the processor 204 receives player selections, for example, a selection of a number of pay lines and an amount to wager per pay line, via the buttons 236. At step 510, the processor 204 conducts a base game, for example, by selecting and evaluating symbols as described in relation to FIGS. 3 and 4 above. At step 515, the processor determines whether to trigger a feature game, for example, by determining whether the selected symbol incorporates a defined number of scatter symbols. If there is no trigger, the method ends at step 520.

If there is a trigger, at step 525, the processor 204 initiates the series of game instances, in this example, by setting a spin counter in memory 208 to a defined number N of spins. In an example, the initial number of spins N is fixed. In another example, the initial number of spins N is dependent on the number of scatter symbols in the trigger.

At step 530, the processor 204 initializes a designated symbol counter in memory 208. In an example, the designated symbol counter is set to zero. In another example, the trigger symbols are the designated symbols and the processor 204 sets the designated symbol counter to the number of trigger symbols in the trigger.

At step 535, the processor 204 controls the primary game display 240 to display a multiplier meter, for example, as part of transitioning the primary game display 240 to display the feature game. An example of a multiplier meter 630 is shown in a series of exemplary screen displays in FIGS. 6 to 9.

Figure 6:
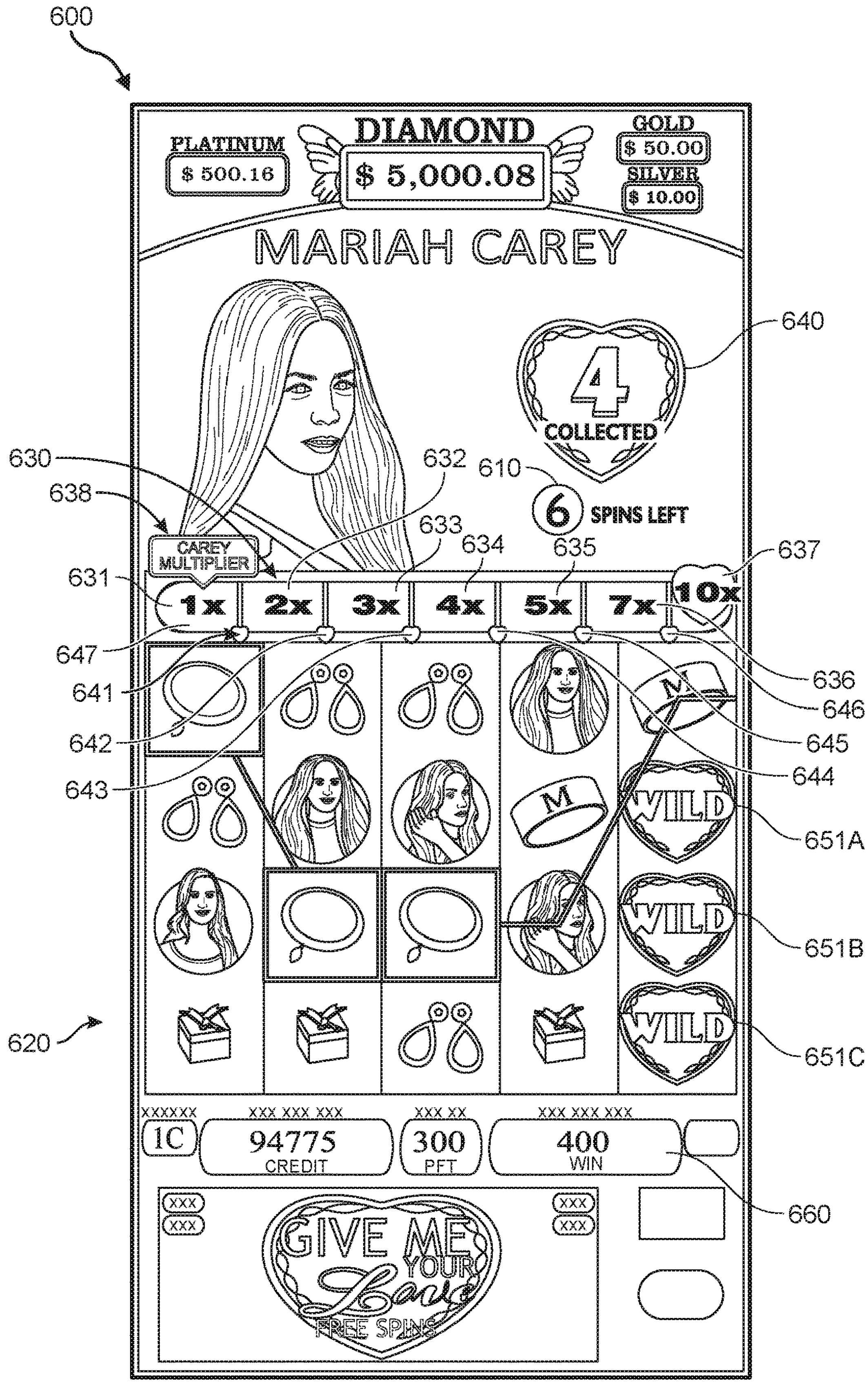
FIGS. 6 to 9 are example screen displays corresponding to the method of FIG. 5.

Referring to FIG. 6, screen display 600 shows an example where the multiplier meter 630 has seven levels being a 1× multiplier 631, a 2× multiplier 632, a 3× multiplier 633, a 4× multiplier 634, a 5× multiplier 635, a 7× multiplier 636 and a 10× multiplier 637. FIG. 6 shows a current multiplier indicator 638 indicative of a first position that a 1× multiplier is being applied. In an alternative example, the multiplier meter does not include a 1× multiplier and no multiplier is indicated until a 2× multiplier applies.

FIG. 6 shows an example, where a number of designated symbols have already been collected as will be explained in further detail below and as such a visual representation of the designated symbol counter 640 shows a value of four indicating that four symbols have been collected. Further, the multiplier meter 630 indicates a progress towards a next multiplier level. The multiplier meter 630 includes a progress indicator indicative of the progress based on the number of designated symbol collected. In this example, the progress indicator is in the form of a progress bar 647, shown as having progressed four tenths of the way to the first threshold 641. In another example (not shown), the progress indicator is in the form of a dial pointer, that can progress towards a number of thresholds. It will be appreciated that in an example the designated symbol counter 640 will initially show zero and the progress bar 647 will not be displayed until there is a progress. It will also be appreciated that the description below on the progress bar 647 is also applicable to, with minor modification, a dial pointer.

Referring back to FIG. 5, at step 540, the processor 204 selects symbols from symbol data stored in the memory 208. In an example, the symbol data is the same set of reel strips used in the base game. In another example, a set of feature game reel strips are used. In either example, the processor 204 selects the symbols using the technique described in relation to FIGS. 3 and 4 above.

At step 545, the processor 204 determines whether the selected symbols include one or more designated symbols. Referring to the example of FIG. 6, it will be seen that there are 20 symbols selected by the processor 204 in an array 620 having 5 columns and 4 rows. Three designated symbols 651A, 651B and 651C have been selected.

At step 550, the processor 204 updates the designated symbol counter in memory 208 and at step 555, the processor 204 determines whether the number of collected symbols has reached or exceeded one of a plurality of defined thresholds 641-646. In this respect, in the example shown in FIG. 6, the defined thresholds 641-646 are displayed as part of the multiplier meter 630 such that there is a first threshold 641 of ten designated symbols, a second threshold 642 of twenty designated symbols, a third threshold 643 of thirty designated symbols, a fourth threshold 644 of forty designated symbols, a fifth threshold of fifty designated symbols, and a sixth threshold 646 of sixty designated symbols.

Where the value of the designated symbol counter 640 is above any of the defined thresholds 641-646, the processor 204 changes, at step 560, the multiplier to apply in evaluating game outcomes. The multiplier to apply is stored in memory 208. In embodiments of the disclosure, as will be described in further detail below, when the multiplier is changed, a number of spins, for example, two additional spins, is also added to a spin counter 610 (of FIG. 6) at step 565. The spin counter 610 is also displayed as part of the screen display 600.

At step 570, the processor 204 updates primary game display 240 of the multiplier meter 630 to reflect a current status. For example, in the example of FIG. 6 with three wild symbols additionally collected, the progress bar 647 would be advanced by an equivalent of $3/10$ of a segment of the multiplier meter 630 that corresponds to the 1× multiplier 631. If the multiplier meter 630 has advanced beyond the first threshold 641, the multiplier meter 630 is moved to point to the 2× multiplier 632, but in this case, such an update is not required in relation to FIG. 6.

At step 575, the processor 204 evaluates the displayed symbols based on the multiplier meter 630 and a pay table stored in the memory 208. Any winning combinations are credited to the win meter 660. That is, if a multiplier is updated at step 560, the multiplier updated is applied by processor 204 in step 575 at the current iteration of steps 540-580. Alternatively, the multiplier updated is applied by processor 204 in step 575 at a next iteration (if any) of steps 540-580.

At step 580, the processor 204 determines whether the spin counter has reached zero and if it has not, the processor 204 reverts to step 540 and conducts a further step of selecting symbols. If the spin counter has reached zero, the processor 204 ends the game at step 520.

Figure 7:
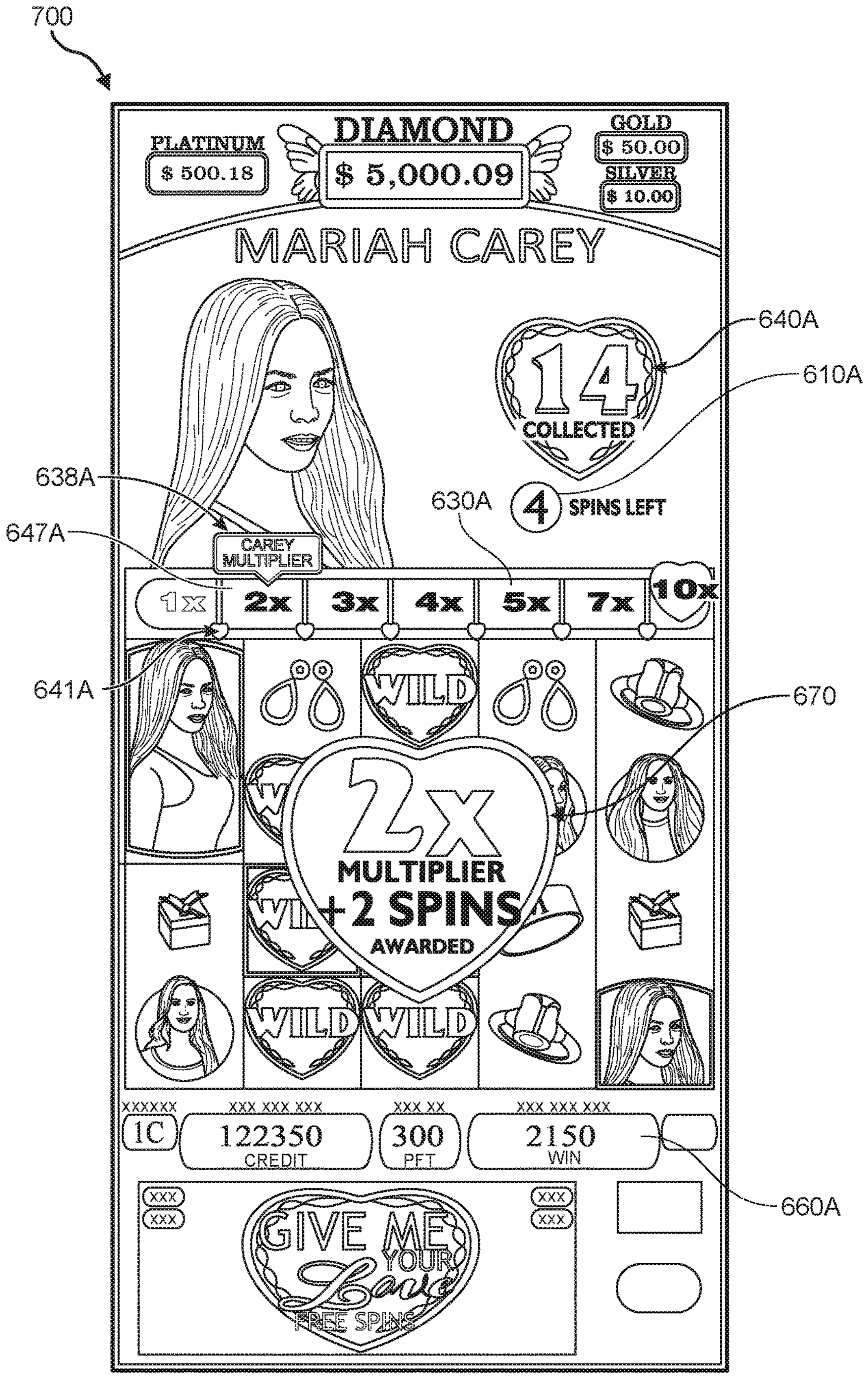
Figure 8:
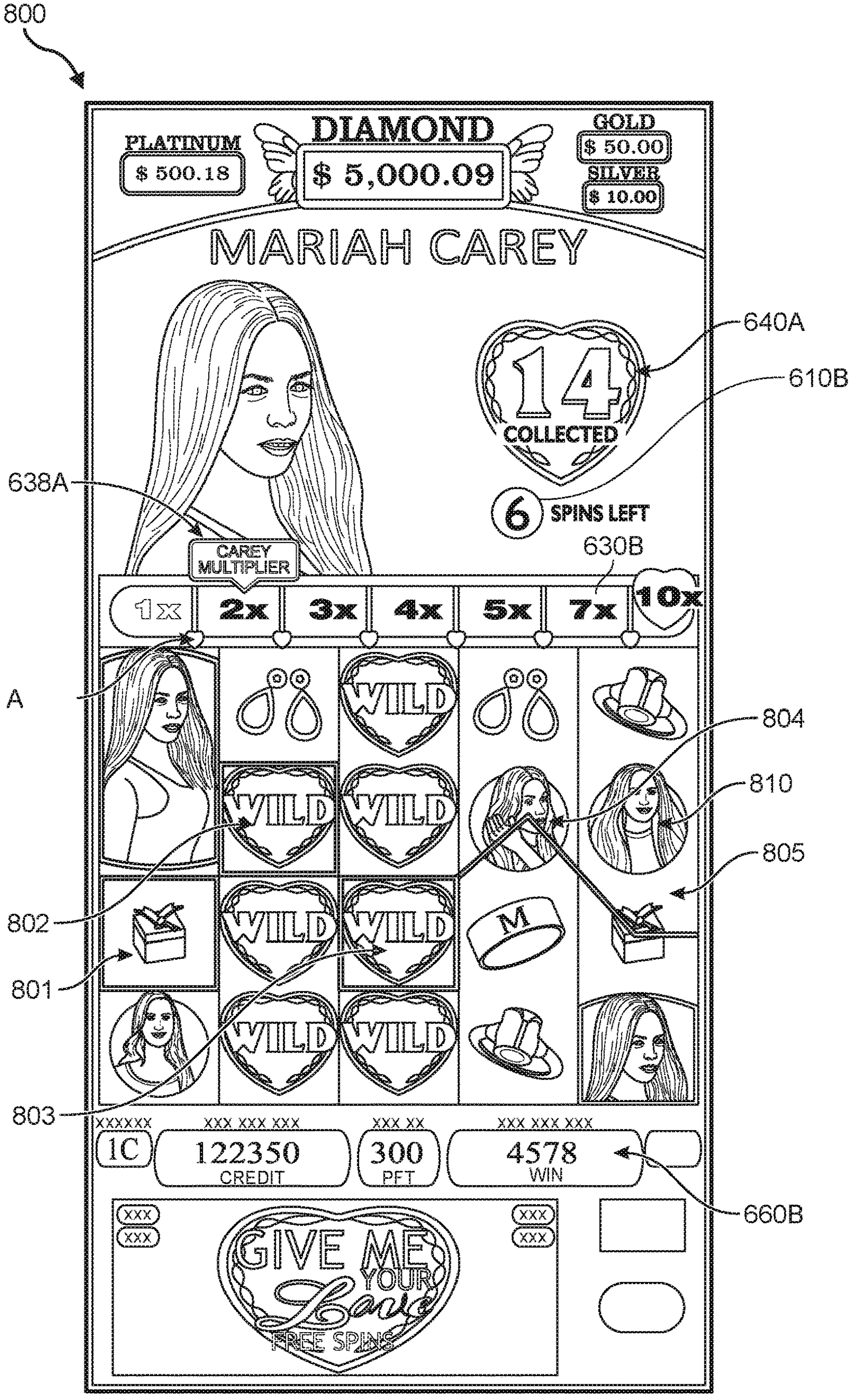
Figure 9:
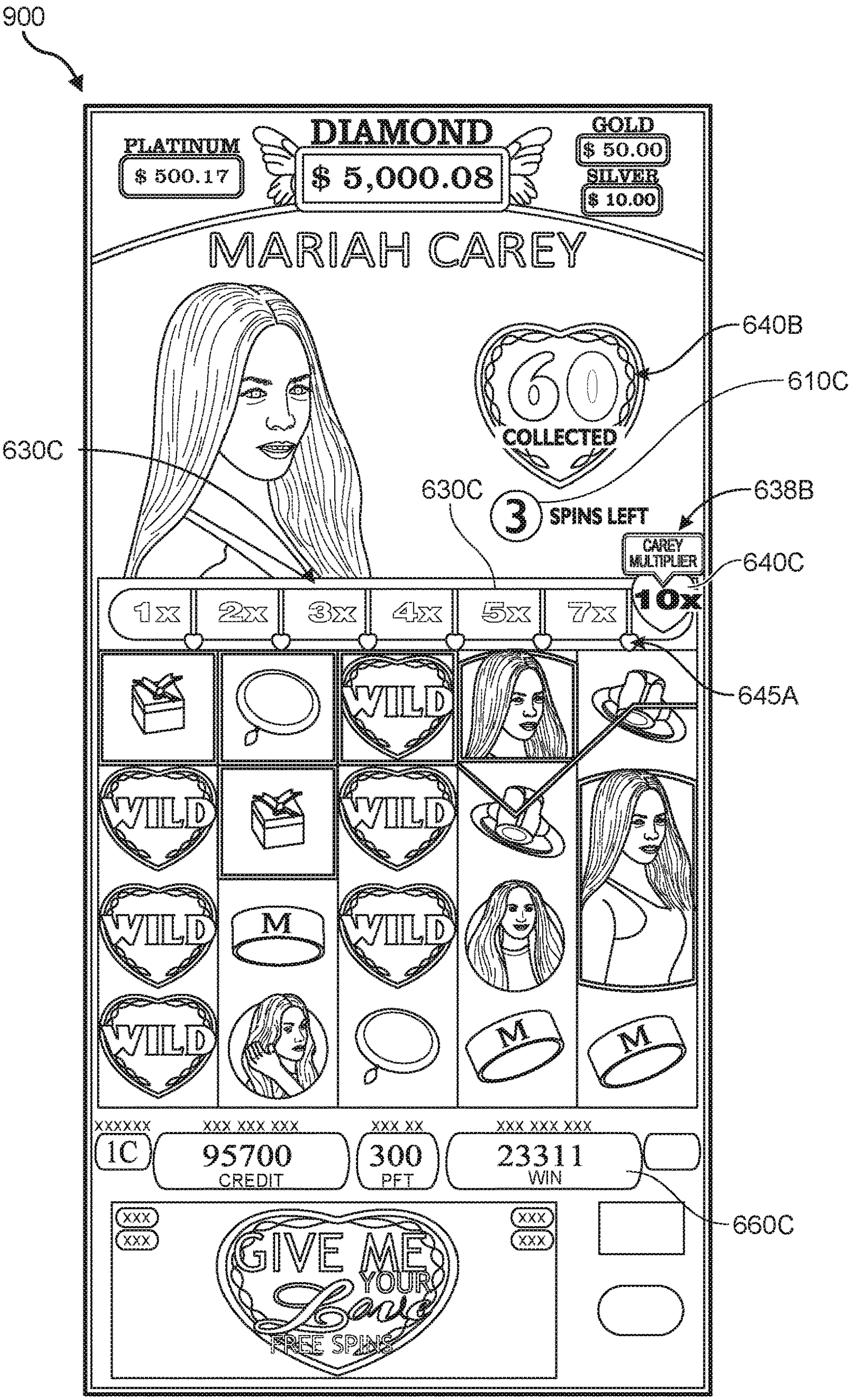

Further exemplary operations of the multiplier meter 630 are shown in FIGS. 7-9. For example, FIG. 7 shows a screen display 700 where sufficient designated symbols have been added to the designated symbol counter 640A at step 550 (of FIG. 5) so that there are now 14 symbols collected and the number of symbols collected has exceeded the first threshold 641A during a current game instance. A message 670 is displayed overlaying the reels to indicate that the 2× multiplier in the second threshold 642 and 2 spins have been awarded. Multiplier indicator 638A has been updated to indicate a second position and progress bar 647A has also been advanced to a position corresponding to 14 collected designated symbols. FIG. 7 illustrates the screen display 700 prior to the two spins being added or wins being calculated such that win meter 660A shows $2,150 at this time.

FIG. 8 shows a subsequent screen display 800 where the two awarded additional spins have been added to the spin counter 610B and evaluation of the symbols has begun.

FIG. 8 illustrates that the display as a pay line 810 that passes through symbol positions 801, 802, 803,804, and 805 is being evaluated and awards have been added to the win meter 660B to show an updated credit value of $4578 credits on the win meter.

FIG. 9 illustrates an exemplary screen display 900 of the multiplier meter 630 where 60 designated symbols have been collected as shown by designated symbol counter 640B. As the sixth threshold 646 has been reached, a current multiplier indicator 638B has advanced to the final position to indicate that a 10× multiplier 640C is being applied. It will be noted that at this stage the progress bar 647 is no longer being displayed as no further progress can be made. In one example, symbols beyond the sixth threshold 646 which corresponds to a highest multiplier (the 10× multiplier 637) are no longer collected. The exemplary screen display 900 shows that the number of spins left 610C is 3. The final three spins will be evaluated with a 10× multiplier. That is, in this example, the highest multiplier can no longer be advanced and no additional spins can be awarded once the 10× multiplier 637 has been awarded. A win meter 660C now has a value of 23311 credits.

In an alternate example, the evaluation of the symbols can occur for winning a combination prior to updating the designated symbol counter 640B and any meters. In a further alternative, an evaluation of the symbols can occur prior to a multiplier being updated and a further evaluation can occur if a multiplier is updated.

Figure 10:
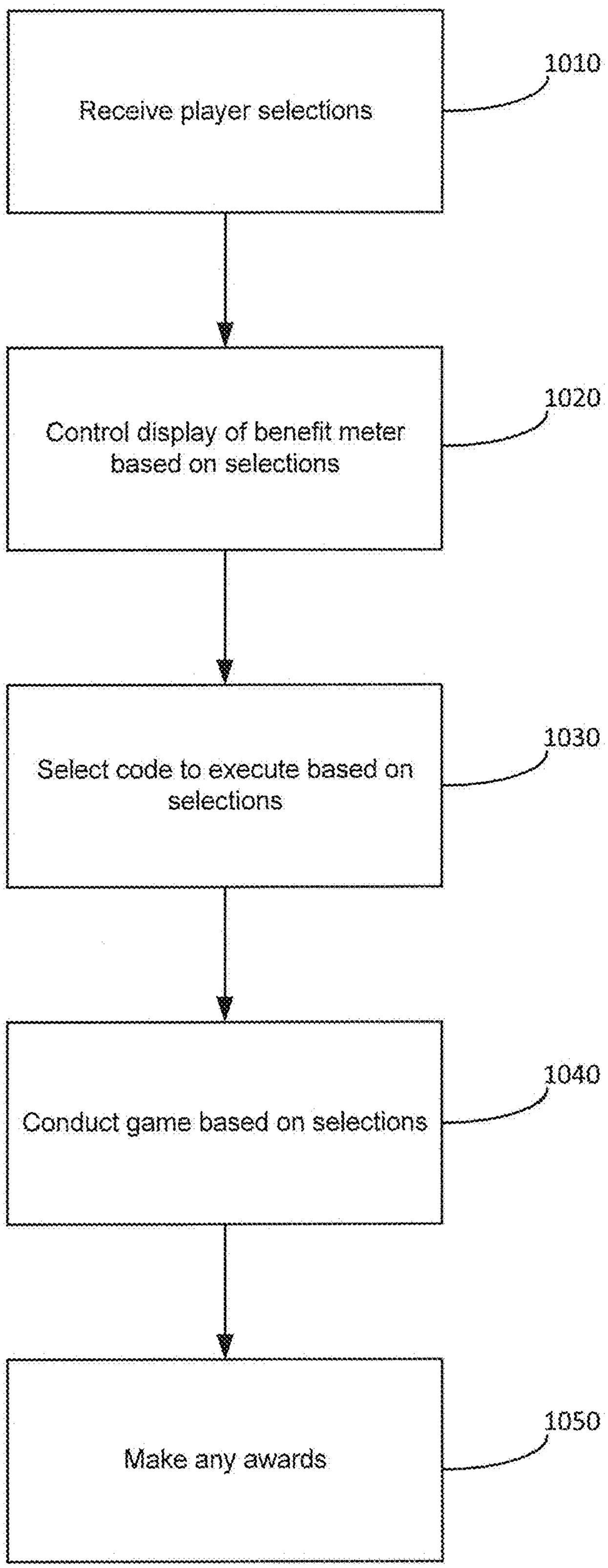
FIG. 10 is a flow chart another method carried out by the processor.

FIG. 10 illustrates an alternative method of operating a gaming device to employ a meter (not shown) advanceable based on a collection of designated symbols. In this alternative, the meter indicates one or more benefits including, but not limited to, a multiplier as described hereinbefore. Other benefits of such a multiplier includes any one or more of: an award of free games, addition of one or more wild symbols to replace existing symbol(s) in the reel strip during free games, and addition of one or more multiplier symbols to replace existing symbol(s). At step 1010, the gaming device 200 receives player selections, for example, via buttons 236. At step 1020, the processor 204 controls the primary game display 240 to display a benefit meter based on the player selections. At step 1030, the processor 204 selects code to execute based on the player selections and at step 1040, the processor 204 conducts the game based on the selections by executing the selected code, including the display and advancement of the benefit meter. At step 1050, the processor 204 makes any awards.

Figures 11A, 11B:
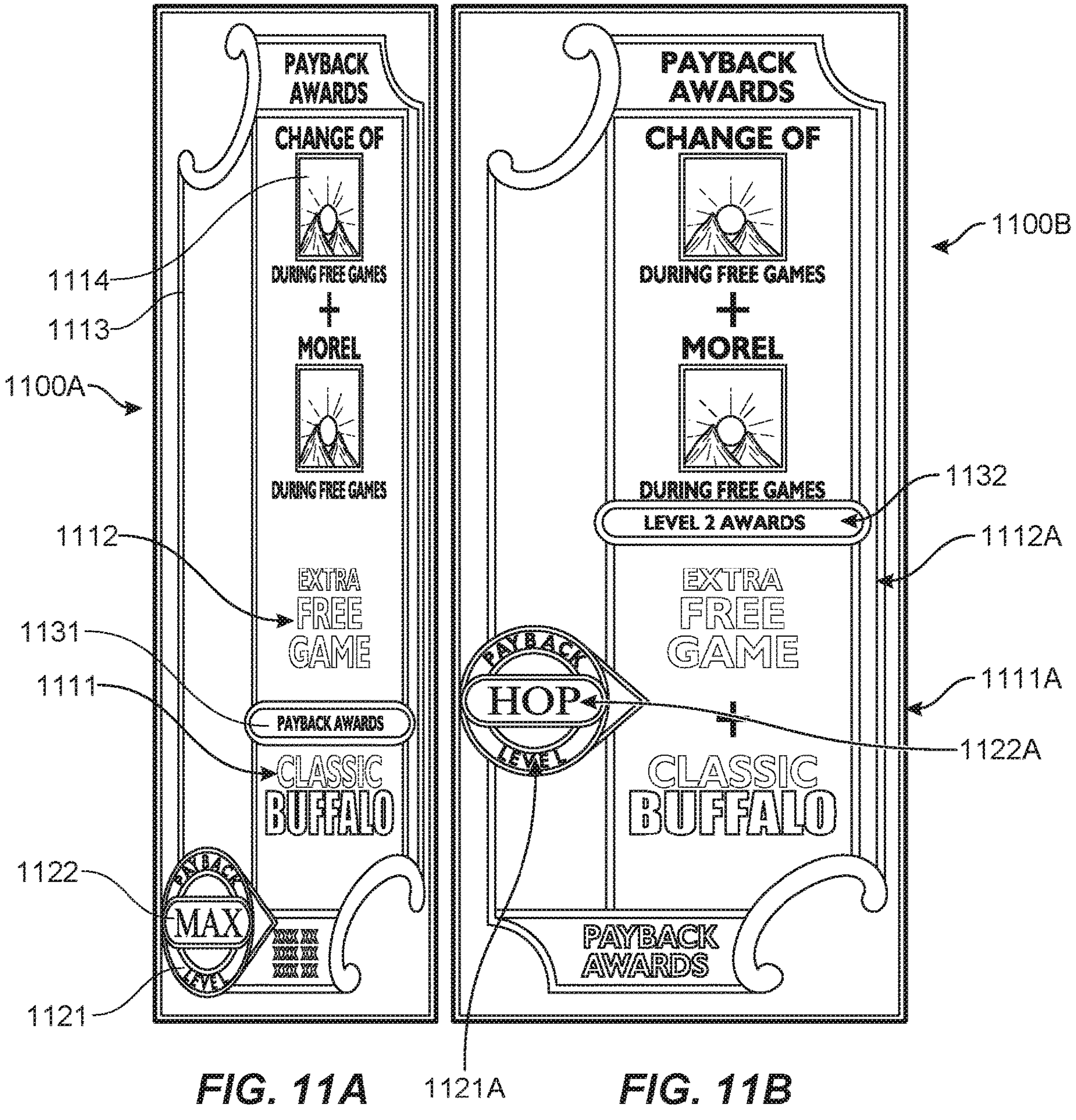
FIGS. 11A to 11D are example partial screen displays corresponding to the method of FIG. 10.

FIGS. 11A-11D are four examples of screen display portions 1100A-1100D showing a benefit meter. Referring to FIG. 11A, the benefit meter has four segments, including a first segment 1111, a second segment 1112, a third segment 1113 and a fourth segment 1114. Referring to FIG. 11A, the first segment 1111 is highlighted to indicate that a first level of benefits applies. This is additionally communicated at the position of the payback level indicator 1121, text 1122 on the payback level indicator which indicates that it is at the "classic level", text "classic buffalo" within the first segment 1111, and highlighted box 1131 which indicates that "level 1 awards" apply. Thus, the meter in FIG. 11A indicates that a single level of benefit applies.

Referring to FIG. 11B, in an exemplary display portion 1100B, first segment 1111A and second segment 1112A are highlighted to display the text "extra free game+classic buffalo," payback level indicator 1121A has been modified by including text "hot" 1122A, and highlighted box 1132 indicates "level 2 awards" apply.

Figure 11C:
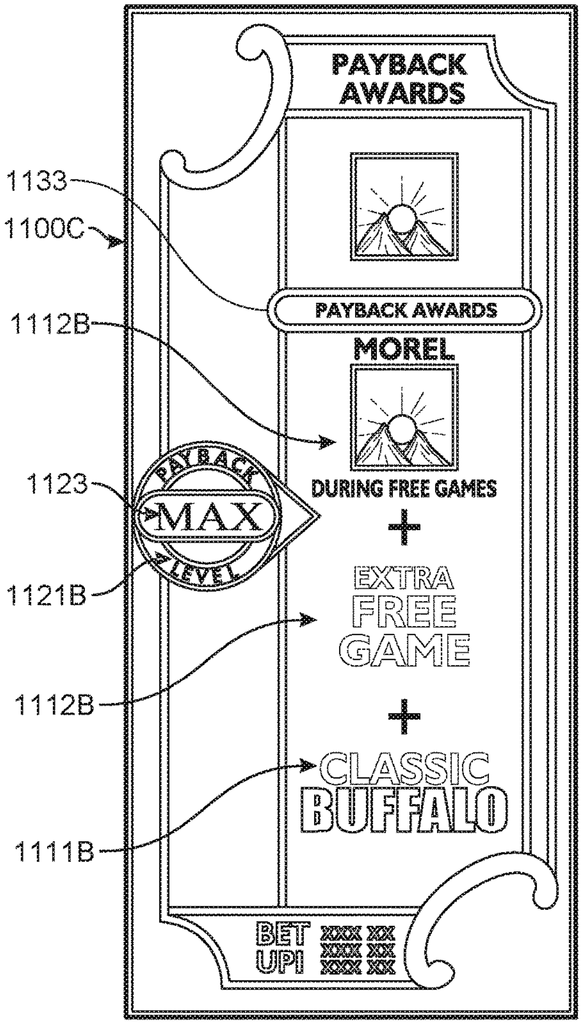

Referring to FIG. 11C, the meter is further updated so that segments 1111B, 1112B, and 1113B are highlighted to indicate that more chance of a specific symbol appearing during free games plus an extra free game plus the classic buffalo features. Payback indicator 1121B is updated to include text "super" 1123, and highlighted box 1133 indicates "level 3 awards" apply.

Figure 11D:
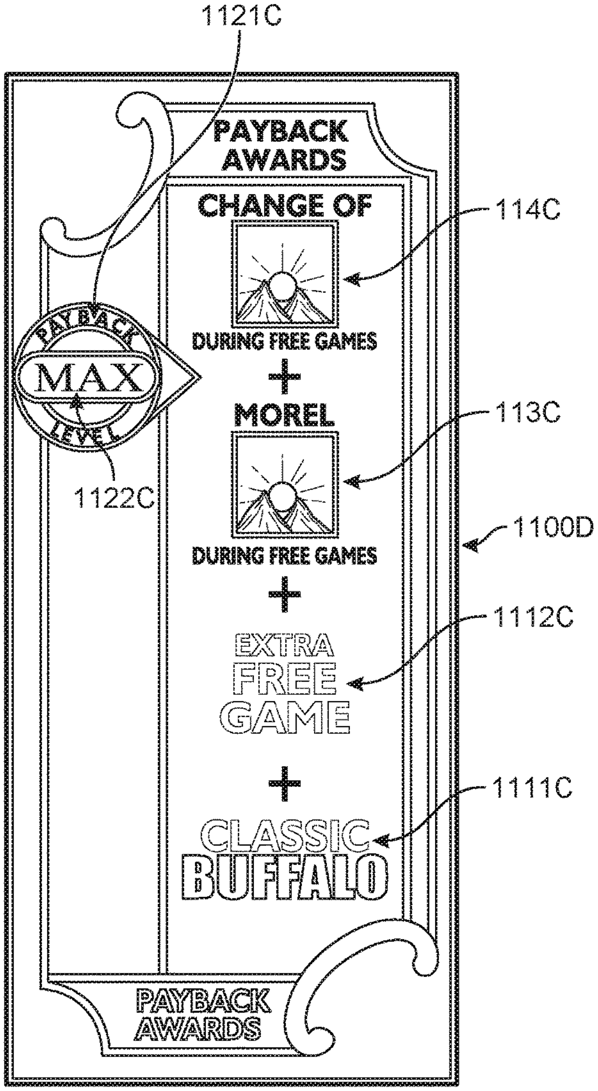

Referring to FIG. 11D, in this example, segments 1111C-1114C are highlighted so that the player can read that there is a chance of a ×4 multiplier symbol appearing during free games plus more of a specific symbol appearing during free games plus an extra free game plus the classic buffalo features. This is indicated by payback level indicator 1121C that includes text "max" 1122C. Similar to steps 540 to 575 (of FIG. 5), advancement of the benefit meter sequentially from FIGS. 11A-11D may be based on A number of designated symbols collected towards respective thresholds, except that references to "multiplier" are to be expanded to "benefit".

Figure 12:
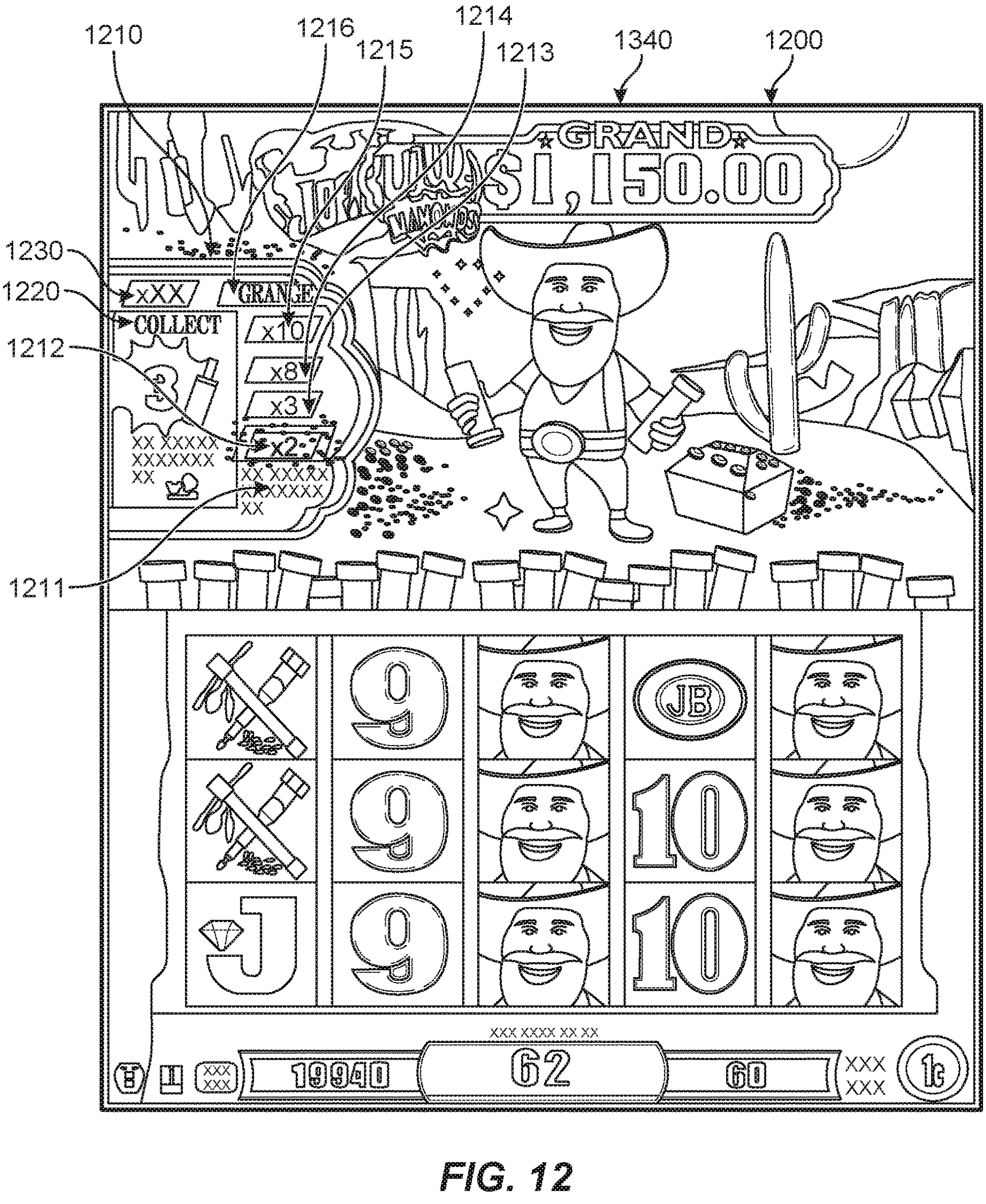
FIGS. 12 and 13 are example screen displays corresponding to a variant of the method of FIG. 5.
Figure 13:
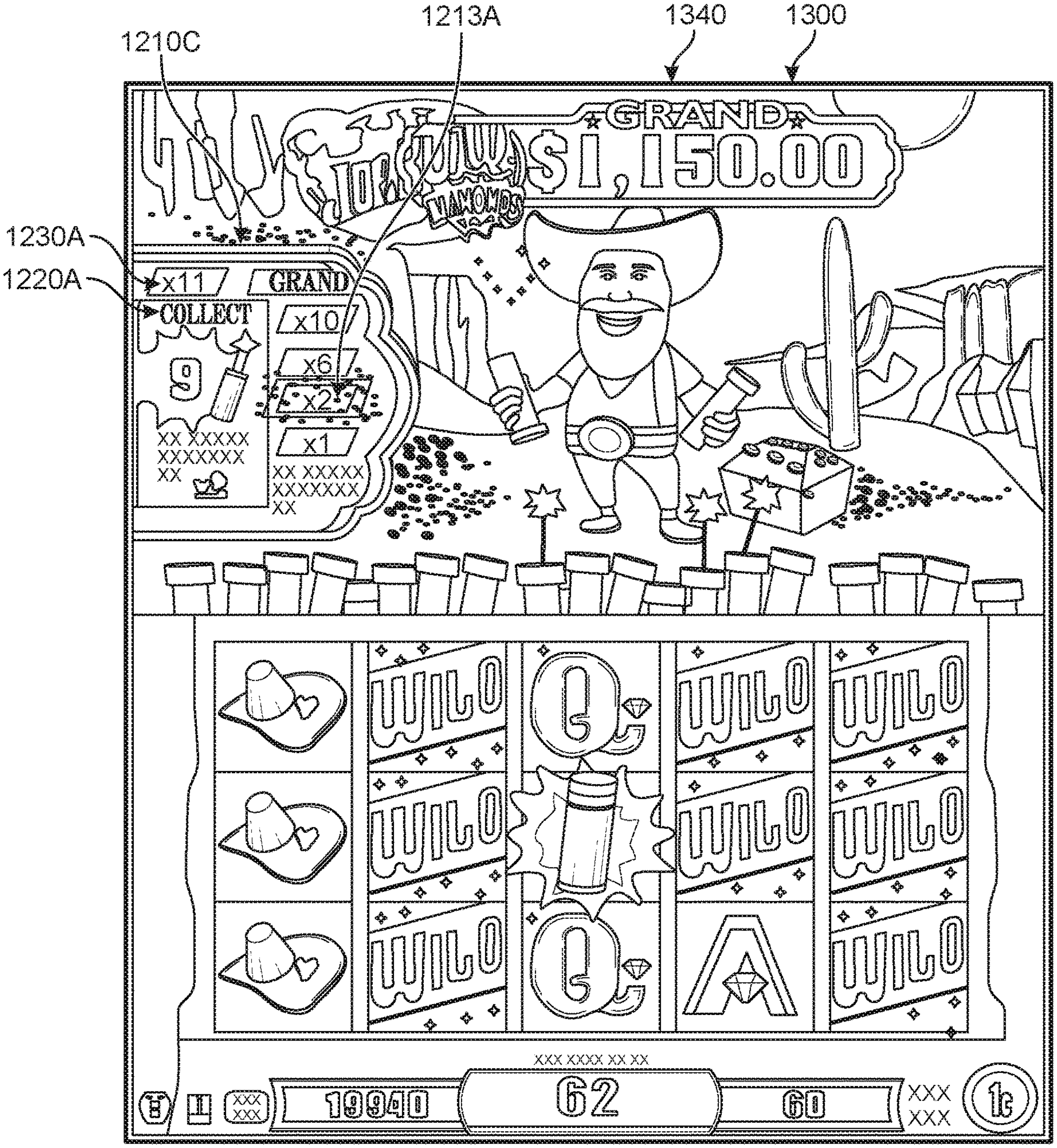

FIGS. 12 and 13 illustrate a further example of a multiplier meter 1210 which has a grand prize level 1216 that corresponds to a prize amount in addition to having five levels of different multipliers. That is, multiplier meter 1210 has six levels being a 1× multiplier level 1211, a 2× multiplier level 1212, a 3× multiplier level 1213, a 5× multiplier level 1214, a 10× multiplier level 1215, and the grand prize level 1216. FIG. 12 is a screenshot 1200 that shows an example, where the 1× multiplier level 1211 is highlighted by being displayed with additional text and graphics to indicate that a 1× multiplier applies. Progress is also indicated by the multiplier meter 1210 by providing a counter 1230 indicating the total number of "TNT" symbols collected and a message 1220, here "Collect 3 TNT symbol to increase multiplier to ×2" to indicate a state of progress towards the 2× multiplier level 1212.

FIG. 13 is a screenshot 1300 that gives an example of an updated state of multiplier meter 1230A. The multiplier meter 1230A now shows that a third level of multiplier 1213A applies. Progress is also indicated by multiplier meter 1230A indicating an updated total number of "TNT" symbols collected (11) and an updated message 1220A, "Collect 9 TNT symbol to increase multiplier to ×5" to indicate a state of progress towards the 5× multiplier level 1214.

In the example of FIGS. 12 and 13 a grand prize having an amount 1340 shown as part of the screenshots 1200, 1300 is awarded if the 5× multiplier level 1214 reaches the grand prize level 1216.

An example embodiment provides a gaming device comprising a display, a processor, and a memory storing a) symbol data specifying a plurality of selectable symbols including a designated symbol, b) a pay table, c) a win meter, and d) instructions which when executed by the processor, cause the processor to: initiate a series of game instances; control the display to display a multiplier meter that a) has a plurality of multiplier levels that correspond to respective ones of a sequence of possible multipliers that can apply to outcomes of the game instances and b) when a multiplier applies, indicates a current multiplier level; initialize a designated symbol counter; and in each game instance, (a) select symbols from the symbol data for display on the display at respective ones of a plurality of symbol positions, (b) evaluate the displayed symbols to identify any winning combinations of symbols, and for each winning combination determine an award amount based on the current multiplier and the pay table, (c) add any awards to the win meter, (d) increment the designated symbol counter by the number of designated symbols in the displayed symbol, (e) change the current multiplier level upon the designated symbol counter exceeding a defined threshold that applies to the respective multiplier level; and (f) updating display of the multiplier meter to indicate the current multiplier level.

In an example embodiment, when the instructions are executed by the processor, they cause the processor to change the current multiplier level prior to evaluating the displayed symbols.

In an embodiment, when the instructions are executed by the processor, they cause the processor to change the current multiplier level after evaluating the displayed symbols.

In an embodiment, when the instructions are executed by the processor, they cause the processor to control the display to display an indicator in order to indicate the current multiplier level.

In an embodiment, when the instructions are executed by the processor, they cause the processor to control display of the meter based on a current value of the designated symbol counter so that the meter also indicates progress towards a next multiplier level.

In an embodiment, when the instructions are executed by the processor, they cause the processor to award at least one additional game instance responsive to the changing the current multiplier level.

In an embodiment, when the instructions are executed by the processor, they cause the processor to initiate the series of game instances in response to a trigger condition being met in respect of a base game conducted by the gaming device.

In an embodiment, the multiplier meter further comprises at least one level that corresponds to a prize amount.

Another example embodiment provides a method of operating a gaming device comprising a display, a processor, and a memory storing a) symbol data specifying a plurality of selectable symbols including a designated symbol, b) a pay table, and c) a win meter, the method comprising: initiating a series of game instances; controlling the display to display a multiplier meter that a) has a plurality of multiplier levels that correspond to respective ones of a sequence of possible multipliers that can apply to outcomes of the game instances and b) when a multiplier applies, indicates a current multiplier level; initializing a designated symbol counter; and in each game instance, (a) selecting symbols from the symbol data for display on the display at respective ones of a plurality of symbol positions, (b) evaluating the displayed symbols to identify any winning combinations of symbols, and for each winning combination determine an award amount based on the current multiplier and the pay table, (c) add any awards to the win meter, (d) increment the designated symbol counter by the number of designated symbols in the displayed symbol, (e) change the current multiplier level upon the designated symbol counter exceeding a defined threshold that applies to the respective multiplier level; and (f) updating display of the multiplier meter to indicate the current multiplier level.

Another example embodiment provides a gaming system comprising: a display; one or more processors and at least one memory storing a) symbol data specifying a plurality of selectable symbols including a designated symbol, b) a pay table, c) a win meter, and d) instructions which when executed by the processor, cause the one or more processors to: initiate a series of game instances; control the display to display a multiplier meter that a) has a plurality of multiplier levels that correspond to respective ones of a sequence of possible multipliers that can apply to outcomes of the game instances and b) when a multiplier applies, indicates a current multiplier level; initialize a designated symbol counter; and in each game instance, (a) select symbols from the symbol data for display on the display at respective ones of a plurality of symbol positions, (b) evaluate the displayed symbols to identify any winning combinations of symbols, and for each winning combination determine an award amount based on the current multiplier and the pay table, (c) add any awards to the win meter, (d) increment the designated symbol counter by the number of designated symbols in the displayed symbol, (e) change the current multiplier level upon the designated symbol counter exceeding a defined threshold that applies to the respective multiplier level; and (f) updating display of the multiplier meter to indicate the current multiplier level.

Another example embodiment provides a gaming device comprising: a display; a processor; and a memory storing instructions which when executed by the processor, cause the processor to: controlling the display to display a benefit meter that a) has a plurality of benefit levels that correspond to respective ones of a plurality of possible benefits that can apply to game instances and b) when a benefit applies, indicates a current benefit level; and conduct a game in accordance with the indicated current benefit level.

In an example embodiment, the gaming device comprises an input device operable by a player to make one or more player selections and when the instructions are executed by the processor, they cause the processor to control display of the benefit meter based on the one or more player selections.

Another example embodiment provides a method of operating a gaming device comprising a display, the method comprising: controlling the display to display a benefit meter that a) has a plurality of benefit levels that correspond to respective ones of a plurality of possible benefits that can apply to game instances and b) when a benefit applies, indicates a current benefit level; and conducting a game in accordance with the indicated current benefit level.

Another example embodiment provides a gaming system comprising: a display; one or more processors; and at least one memory storing instructions which when executed by the processor, cause the processor to: controlling the display to display a benefit meter that a) has a plurality of benefit levels that correspond to respective ones of a plurality of possible benefits that can apply to game instances and b) when a benefit applies, indicates a current benefit level; and conduct a game in accordance with the indicated current benefit level.

In the claims which follow and in the preceding description of the invention, except where the context requires otherwise due to express language or necessary implication, the word “comprise” or variations such as “comprises” or “comprising” is used in an inclusive sense, i.e. to specify the presence of the stated features but not to preclude the presence or addition of further features in various embodiments of the invention.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A electronic gaming system comprising:

at least one server; and a gaming device coupled to the at least one server and having a user interface operable to display a plurality of symbol positions, a device processor, and memory storing a symbol set including a plurality of selectable symbols including a plurality of designated symbols, and device instructions, and wherein the device instructions, when executed, cause the device processor to at least:

receive, from the at least one server, data indicative of a plurality of combinable benefits being formed from a plurality of prizes, cause the gaming device to employ a meter advanceable based on different collections of designated symbols for different levels of prizes, to top the meter with a jackpot prize, and to point to a current level indicative of a current prize being awardable, in a first instance of a series of game instances, receive, from the at least one server, data indicative of a plurality of symbols being selected for display based on a random number generated by a random number generator, cause the gaming device to display, via the user interface, a message that overlays at least one of the designated symbols to indicate a changed multiplier level and an award of additional spins corresponding to a threshold of the meter, cause the gaming device to display, via the user interface and within the meter, a progress indicator that visually represents both a current quantity of designated symbols collected and a remaining quantity of designated symbols needed for the meter to advance to a next level indicative of a next prize being made awardable, cause the gaming device to display, via the user interface, the meter advancing to the next level when the quantity of designated symbols in a winning combination of symbols is identified from the plurality of symbols displayed, and cause the gaming device to proceed, via the user interface, to a next instance of the series of game instances.

2. The electronic gaming system of claim 1, wherein the device instructions, when executed, further cause the device processor to combine both the current prize and the next prize when the meter advances to the next level.

3. The electronic gaming system of claim 2, wherein the device instructions, when executed, further cause the device processor to display both the current prize and the next prize being awarded when the meter advances into the next level.

4. The electronic gaming system of claim 1, wherein the device instructions, when executed, further cause the gaming device to display a text representing one or more of the different levels of prizes.

5. The electronic gaming system of claim 1, wherein the device instructions, when executed, further cause the device processor to display an additional game instance being initiated responsive to changing the current level.

6. The electronic gaming system of claim 1, wherein the device instructions, when executed, further cause the device processor to initiate the series of game instances responsive to a trigger condition being met in a base game.

7. The electronic gaming system of claim 1, wherein the device instructions, when executed, further cause the device processor to display the jackpot prize being awarded when the next level is a top level.

8. The electronic gaming system of claim 1, wherein the device instructions, when executed, further cause the device processor to:

change the multiplier level in response to a counter of the designated symbols exceeding the threshold, update, within a game instance included in the series of game instances, the meter to indicate the changed multiplier level before evaluating the designated symbols for the winning combination, and apply the changed multiplier level during the evaluation of the designated symbols within the game instance.

9. A method of providing additional awards on an electronic gaming system having at least one server coupled to a gaming device with a user interface operable to display a plurality of symbol positions, the at least one server comprising a server processor and a server memory, the method comprising:

transmitting, from the at least one server, data indicative of a plurality of combinable benefits being formed from a plurality of outputs;

transmitting, from the at least one server, data indicative of a meter advanceable based on different collections of designated symbols for different levels of outputs, topped with a jackpot level having a jackpot prize, and pointing to a current level indicative of a current output being awardable;

in a first instance in a series of game instances, transmitting, from the at least one server, data indicative of an outcome;

causing the gaming device to:

select a plurality of symbols associated with the outcome based on a random number generated by a random number generator, display—via the user interface—a message that overlays at least one of the designated symbols to indicate a changed multiplier level and an award of additional spins corresponding to a threshold of the meter, display—via the user interface and within the meter—a progress indicator that visually represents both a current quantity of designated symbols collected and a remaining quantity of designated symbols needed for the meter to advance to a next level indicative of a next output being made awardable, and advance the meter to the next level when the quantity of designated symbols in a winning combination of symbols is identified from the plurality of symbols displayed; and causing the gaming device to proceed to a next instance in the series of game instances.

10. The method of claim 9, further comprising combining both the current output and the next output when the meter advances to the next level.

11. The method of claim 10, further comprising awarding both the current output and the next output when the meter advances into the next level.

12. The method of claim 9, further comprising transmitting, from the at least one server, data indicative of a text representing one or more of the different levels of outputs.

13. The method of claim 9, further comprising awarding an additional game instance responsive to changing the current level.

14. The method of claim 9, further comprising initiating the series of game instances responsive to a trigger condition being met in a base game.

15. The method of claim 9, further comprising awarding the jackpot prize when the next level is the jackpot level.

16. A non-transitory computer-readable medium comprising a plurality of device instructions in a remote gaming device that comprises a device processor and a user interface operable to display a plurality of symbol positions, the remote gaming device being networked to at least one server, the at least one server comprising a server memory, and the device instructions, which, when executed, cause the device processor to perform the steps of:

receiving, from the at least one server, data indicative of a plurality of combinable benefits being formed from a plurality of benefits;

employing a meter advanceable based on different collections of designated symbols for different levels of benefits, and pointing to a current level indicative of a current benefit being awardable;

topping the meter with a jackpot level having a jackpot prize;

in a first instance in a series of game instances, receiving, from the at least one server, data indicative of a plurality of symbols being selected for display based on a random number generated by a random number generator, displaying—via the user interface—a message that overlays at least one of the designated symbols to indicate a changed multiplier level and an award of additional spins corresponding to a threshold of the meter, animating—via the user interface and within the meter—a progress indicator that visually represents both a current quantity of designated symbols collected and a remaining quantity of designated symbols needed for the meter to advance to a next level indicative of a next benefit being made awardable, identifying from the plurality of symbols selected a winning combination, and animating—via the user interface—an advancing the meter to the next level when the quantity of designated symbols is identified in the winning combination; and proceeding to a subsequent instance in the series of game instances.

17. The non-transitory computer-readable medium of claim 16, wherein the device instructions, when executed, cause the device processor to perform the step of combining both the current benefit and the next benefit when the meter advances to the next level.

18. The non-transitory computer-readable medium of claim 17, wherein the device instructions, when executed, cause the device processor to perform the step of awarding both the current benefit and the next benefit when the meter advances into the next level.

19. The non-transitory computer-readable medium of claim 16, wherein the device instructions, when executed, cause the device processor to perform the step of displaying a text representing one or more of the different levels of benefits.

20. The non-transitory computer-readable medium of claim 16, wherein the device instructions, when executed, cause the device processor to perform the step of awarding an additional game instance responsive to changing the current level.

* * * * *